(12) United States Patent
Dworatzek (10) Patent No.: US 9,233,330 B2
(45) Date of Patent: Jan. 12, 2016

(54) SEPARATING ELEMENT FOR SEPARATING LIQUIDS FROM A GAS FLOW

(71) Applicant: MANN+HUMMEL GMBH, Ludwigsburg (DE)

(72) Inventor: Klemens Dworatzek, Edingen (DE)

( * ) Notice: Subject to any disclaimer, the term of this patent is extended or adjusted under 35 U.S.C. 154(b) by 28 days.

(21) Appl. No.: 14/278,208

(22) Filed: May 15, 2014

(65) Prior Publication Data

US 2014/0338295 A1    Nov. 20, 2014

(30) Foreign Application Priority Data

May 15, 2013    (DE) .......................... 10 2013 008 246

(51) Int. Cl.
*B01D 46/00*    (2006.01)
*B01D 46/24*    (2006.01)

(52) U.S. Cl.
CPC ........ *B01D 46/0002* (2013.01); *B01D 46/0005* (2013.01); *B01D 46/2414* (2013.01); *B01D 2271/022* (2013.01)

(58) Field of Classification Search
CPC ........... B01D 46/0002; B01D 46/0004; B01D 46/0005; B01D 46/2411; B01D 46/2414; B01D 2271/02; B01D 2271/022; B01D 2271/025; B01D 2201/34; B01D 2201/342; B01D 2201/345
See application file for complete search history.

(56) References Cited

U.S. PATENT DOCUMENTS

| 4,721,563 | A | | 1/1988 | Rosaen | |
|---|---|---|---|---|---|
| 6,093,231 | A | * | 7/2000 | Read et al. | 55/498 |
| 6,485,535 | B1 | * | 11/2002 | Linnersten et al. | 55/319 |
| 2005/0044827 | A1 | * | 3/2005 | Eppel et al. | 55/423 |
| 2006/0201871 | A1 | * | 9/2006 | Gillenberg et al. | 210/450 |
| 2006/0213162 | A1 | * | 9/2006 | Jodi | 55/486 |
| 2010/0147153 | A1 | * | 6/2010 | Patel | 96/190 |
| 2012/0193281 | A1 | | 8/2012 | Zhu et al. | |
| 2014/0157738 | A1 | * | 6/2014 | Eberle | 55/482 |

FOREIGN PATENT DOCUMENTS

| DE | 8816432 U1 | 8/1989 |
|---|---|---|
| WO | 2011088290 A2 | 7/2011 |

* cited by examiner

*Primary Examiner* — Robert Clemente
(74) *Attorney, Agent, or Firm* — James Hasselbeck (57) ABSTRACT

A separating element for separating liquid from a gas flow is arranged in a separating container of a liquid separator. The separating container has a housing with a container opening and a cover closing off the container opening. The sealing element has a collar arranged between housing and cover and supported on an upper area of the housing facing the cover. A sealing element is provided that has sealing surfaces arranged between the upper area of the housing and the cover such that the separating container is sealed relative to ambient pressure. The sealing element has a holding element monolithically formed with the sealing element and captively securing the sealing element on the collar. The sealing surfaces and the holding element are designed such that a function of sealing the separating container and a function of holding the sealing element on the collar are separate from each other.

20 Claims, 6 Drawing Sheets

SEPARATING ELEMENT FOR SEPARATING LIQUIDS FROM A GAS FLOW

CROSS-REFERENCE TO RELATED APPLICATION

This application claims the benefit of German patent application No. 10 2013 008 246.3, the entire contents of the aforesaid German patent application being incorporated herein by reference.

BACKGROUND OF THE INVENTION

The invention concerns a separating element for separating at least one liquid from a gas flow, wherein the separating element can be arranged in a separating container of a liquid separator, wherein the separating container comprises a container opening, a housing, and a cover embodied for closing off the container opening. The separating element has a monolithically embodied collar that can be arranged between the housing of the separating container and the cover of the separating container and is designed to be supported on an upper area of the housing which is facing the cover. The separating element has a sealing element that has a sealing surface designed for sealing the separating container wherein the sealing surface can be arranged between the upper area of the housing and the cover such that the separating container is sealed relative to the ambient pressure. The sealing element is captively secured on the collar, wherein holding of the sealing element on the collar is realized by means of at least one holding element that is monolithically formed with the sealing element.

Liquid separators or fluid separators are used in motor vehicles and industrial motors, for example, as integral oil separating containers in screw compressors. The separating element is arranged in a separating container that comprises two parts, i.e., a cover, and the housing. For exchanging the separating element, the cover can be detached from the housing. In the operating state, cover and housing are seal-tightly connected to each other by means of a seal.

The compressed air generation that takes place, for example, in screw compressors requires due to the operating principle a separation of the operating fluid oil from an oil/compressed air flow. For a reliable material separation in these processes, ensuring the spatial separation of the retentate side from the filtrate side is in particular of great importance, in addition to the proper selection of the filter material. For this reason, it is particularly important to mount the separating element in the separating container in a seal-tight way.

In prescribed servicing intervals, the separating element and the seal must be exchanged. In order to ensure that an unused properly arranged seal is used, the publications EP 2 099 544 B1 and DE 10 2007 046 209 A1 disclose a liquid separator with a folded filter medium and a seal that is captively secured on the collar of the separating element. However, it is disadvantageous that the seal which is disclosed in the publications EP 2 099 544 B1 and DE 10 2007 046 209 A1 is joined non-detachably with the collar of the separating element.

The publication EP 2 481 460 A1 discloses a filter element for filtration of fuel with a T-shaped seal that is attached by means of securing knobs. This seal is fastened on a two-part seal support of the filter element. The collar of the filter element must therefore be of a two-part configuration for fastening the seal.

In FIG. 2 of the publication DE 2001 11 003 U1, the seal is fastened on the collar of the separating element by means of an integrated fastening ring. The fastening ring is non-detachably fastened on the collar. The seal can be detachably attached by means of holding knobs on the fastening ring. This construction is however relatively complex.

In FIG. 8 of the publication DE 2001 11 003 U1 as well as in the publications U.S. Pat. No. 4,721,563 and WO 2011/088290 A2 it is disclosed that the seal is attached by means of a formed portion in U-shape on the collar of the separating element. The configuration in U-shape requires however a comparatively large amount of sealing material.

SUMMARY OF THE INVENTION

Based on the afore described disadvantages and imperfections as well as in view of the assessment of the discussed prior art, it is the object of the present invention to further develop a separating element of the aforementioned kind in such a way that it can be produced particularly easily and inexpensively and in particular comprises a sealing element that is still fastened captively on the collar of the separating element.

This object is solved by a separating element wherein the sealing surfaces and the holding element are designed such that the functions of sealing of the separating container and holding of the sealing element on the collar are separate from each other. Advantageous embodiments and expedient further developments of the present invention are characterized in the respective dependent claims.

Accordingly, the present invention is based on the functions of holding and sealing being separate from each other by means of a new seal geometry.

In accordance with the invention, the sealing element is captively secured on the separating element, i.e., is a component of the separating element and not an individual part. Upon exchange of the separating element in the prescribed servicing intervals, the sealing element is thus also reliably exchanged. In the prior art in which the sealing element is arranged non-captively on the separating element, the sealing element may be forgotten so that the function of the liquid separator is impaired or not fulfilled.

Instead of, as disclosed in the prior art, attaching the sealing element by means of a formed part in U-shape about a seal support or a T-shape that is clamped between a two-part seal support, the sealing element is positionally secured by means of at least one holding element, particularly at least one holding knob. This has the advantage that the sealing element can be produced less expensively.

The sealing element is preferably supported only by the collar, the collar thus does not absorb any force at the sealing location. The sealing element is thus independent of possible vibration loads that would be transmitted from the collar onto the sealing element. In order to avoid that vibrations from the separating container are transmitted onto the holding element, the holding element is thus advantageously arranged such on the collar and designed such that the sealing element is supported only by the collar.

In order to configure the functions of sealing of the separating container and holding of the sealing element separate from each other, in a preferred embodiment the sealing surfaces and the holding element are spaced apart from each other at sections thereof, for example, are configured as separate elements at sections thereof.

In an advantageous embodiment of the present invention, the sealing element has a substantially L-shaped base member wherein the sealing surfaces are formed preferably by a first leg of the L-shaped base member which is arranged perpendicular to the collar. The first leg extends preferably immediately between the cover and the housing and is positioned seal-tightly on the cover and on the housing. More precisely, the first leg thus extends between a contact surface of the cover and a contact surface of the housing. The sealing action is thus advantageously realized immediately between cover and housing by the vertical leg of the L-shape. Particularly preferred, the first leg is only designed to seal-tightly connect cover, collar, and housing. The first leg does not serve to detachably or non-detachably connect the sealing element on the collar. The sealing action is realized even more preferred such that the free end of the first leg is contacting the cover and the end of the first leg that is connected to the second leg is contacting the housing, or vice versa. The first leg can thus be compressed between housing and cover wherein the second leg can be without force load. The second leg preferably is positioned between the collar and the cover or the collar and the housing. It can be without force load or can be exposed to a light compressing action. The first leg preferably forms a cylinder-tubular section whose inner wall can contact particularly preferred seal-tightly the radial outer rim or outer surface of the collar for sealing between the raw side and the clean side.

At the side of the collar which is facing away from the second leg of the L-shaped base member of the sealing element, the holding element is arranged at a spacing to the L-shaped base member of the sealing element, in particular at a spacing to the first leg and its sealing surfaces. In this way, between the holding element and the base member of the sealing element, in particular between the holding element and the sealing surfaces, a free space is arranged such that the functions sealing of the separating container and holding of the sealing element are designed separate from each other.

The second leg of the L-shaped base member of the sealing element is advantageously in direct contact, preferably without adhesive, with the collar. So that vibrations of the cover or of the housing of the separating container do not transmit onto the holding element, in an advantageous embodiment of the present invention at the side of the collar which is facing away from the second leg the holding element is arranged at a spacing to the neighboring cover or to the neighboring upper area of the housing wherein a free space is arranged between the holding element and the cover or the upper area of the housing.

For sealing the separating container, in particular in order to seal the separating container relative to ambient pressure, in an advantageous embodiment of the present invention the first leg of the L-shaped base member of the sealing element is in direct contact with
a contact surface of the housing of the separating container.

Preferably, the contact between the first leg of the sealing element and the contact surface of the cover of the separating container as well as between the first leg of the sealing element and the contact surface of the housing of the separating container is free of adhesive. This has the advantage that the sealing element will detach without problems from the separating container upon disassembly. A complicated removal of sealant residues and adhesive residues, as is often the case in flat seals known in the prior art, is unnecessary.

For sealing the separating container, in particular in order to prevent that the fluid to be filtered bypasses the separating element unfiltered, for example, an oil separating cartridge, the first leg of the L-shaped base member of the sealing element in this advantageous embodiment is in direct contact with the outer rim of the collar of the separating element. In this context, the outer rim of the collar of the separating element is the rim of the collar of the separating element which is facing away from the interior of the separating element or from the container opening. In this way, the entire fluid, for example, the entire conveyed compressed air, is passed through a filter medium arranged within the separating element, for example a coalescent filter, and there is no flow generated that bypasses the separating element unfiltered. The contact between the first leg of the sealing element and the outer rim of the collar is realized preferably also without adhesive. This has the advantage that the sealing element with appropriate configuration of the holding element can be fastened detachably on the collar. The holding element is preferably designed such that it can be fastened detachably on the collar, in particular by means of a detachable clamping connection on the collar.

Independent therefrom or in combination therewith, the separating element comprises advantageously at least one coiled filter medium configured for separating the liquid in the gas flow and comprising glass fibers and/or at least one other material, for example, at least one plastic material or cellulose.

Preferably, the material separation in the separating container is realized by a centrifugal preseparation with downstream fine filtration by means of a separating element that is embodied as a coalescent filter element.

The sealing element has preferably an independent profile embodied as a monolithic piece which is connectable by means of the holding element with the collar, in particular attachable captively on the collar, for example, pushable detachably onto the collar or clampable detachably onto the collar or glued onto the collar. In comparison to the separating element, for example disclosed in the publication EP 2 099 544 B1, in which the sealing element is injection-molded onto the collar, the present sealing element with its independent profile has the advantage that the sealing element can be attached manually to the collar.

The holding element is preferably embodied so as to be plugged or pushed into the collar so that mounting can be realized by simple automated insertion in axial direction. This is made possible by the L-shape of the sealing element and would not be possible with the embodiments known from the prior art.

The holding element is preferably formed of one or more projections that project away from the second leg preferably in the same direction as the first leg. These projections can extend through cutouts in the collar. Preferably, the projections are designed to have a mushroom shape, with a stem and an elastically configured holding member at the end of the stem. The holding member preferably has a greater cross-section than the stem and, further preferred, also has a greater diameter than the cutouts in the collar. Further preferred, the holding member can be made smaller by compressing it such that it can be passed through a cutout in the collar and, after having passed through the cutout, can expand such that the holding member projects past the cutout. The cross-section of the stem part of the projections has in this context preferably a cross-section so that the stem fills out the cutouts in the collar in particular in a seal-tight way.

A further advantage of the sealing element of the present separating element is that the sealing element can be produced by injection molding. However, it can also be directly injection-molded onto the collar, for example.

According to another advantageous embodiment of the present invention, the collar is clamped at least at sections thereof directly between the cover and the upper area of the housing. This enables a particularly good hold of the collar on the separating container.

Advantageously, the cover, the collar, and the upper area of the housing, at least in the area in which the collar is directly clamped between the cover and the upper area of the housing, are embodied of an electrically conducting material, in particular of metal. In this context, the collar is preferably clamped such between the cover and the upper area of the housing that an electrically conducting connection between cover and housing is provided. Accordingly, in contrast to, for example, the prior art disclosed in the publications EP 2 099 544 B1, EP 2 481 460 A1 and DE 2001 11 003 U1, it is not necessary to provide electrically conducting elements in the sealing element for providing an electrically conducting connection between cover and housing. It is also possible however to embody the sealing element to be electrically conducting, for example, by forming the sealing element of an electrically conducting material, for example, a plastic material that has been made electrically conducting by means of additives or by means of a conducting, especially metallic, clamp that engages about the sealing element for contacting the housing parts.

An embodiment of the cover and/or the housing and/or the collar from plastic material is also possible, for example, in order to save weight or in order to lower production costs.

For receiving the sealing element, the cover and the upper area of the housing have advantageously each a recess in which the collar is positioned at a spacing to the cover and to the upper area of the housing. In other words, the contact surface of the cover is arranged recessed within the cover and the contact surface of the housing is recessed in the upper area of the housing. These recesses designed for receiving the sealing element enable clamping of the collar directly between the cover and the housing.

The sealing element is correlated directly with the separating element. This has the advantage that the separating element can be delivered in distribution with the premounted sealing element. In this way, the expenditure for mounting at the machine is eliminated.

The present invention concerns moreover a liquid separator comprising a pressure-resistant separating container with a container opening, a housing, and a cover designed for closing off the container opening as well as a separating element according to the aforementioned kind.

The present invention concerns finally the use of a separating element of the aforementioned kind in an oil separator for separating oil from a gas flow.

BRIEF DESCRIPTION OF THE DRAWINGS

As already mentioned above, there are various possibilities to design and further develop the teaching of the present invention in an advantageous way. For this purpose, on the one hand, reference is being had to the dependent claims; on the other hand, further configurations, features, and advantages of the present invention will be explained in more detail in the following inter alia with the aid of the embodiment of a separating element illustrated in the FIGS. 1 through 11.

Same or similar configurations, elements or features are identified in FIGS. 1 through 13 with identical reference characters.

DESCRIPTION OF PREFERRED EMBODIMENTS

Figure 1:
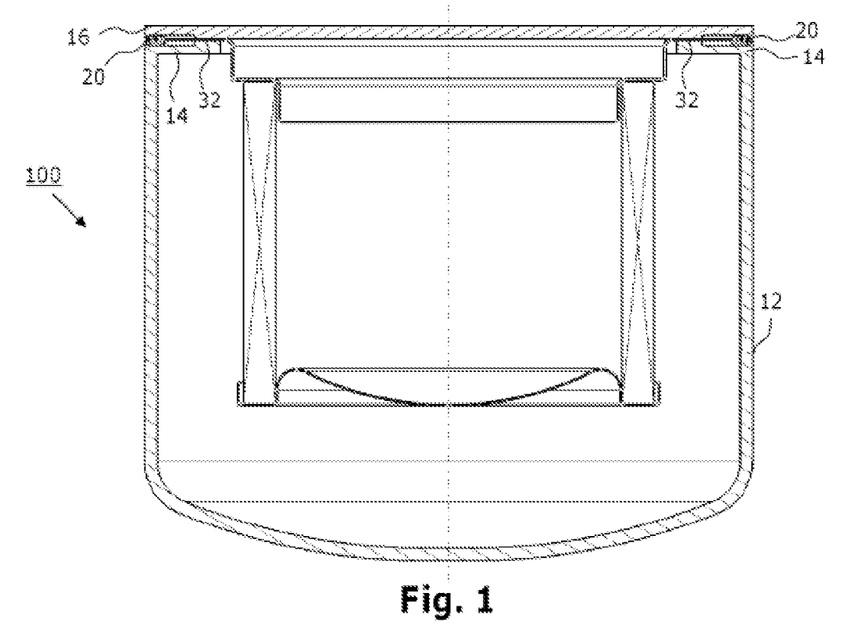
FIG. 1 shows in section illustration a first embodiment of a liquid separator with an embodiment of a separating element according to the present invention.
Figure 2:
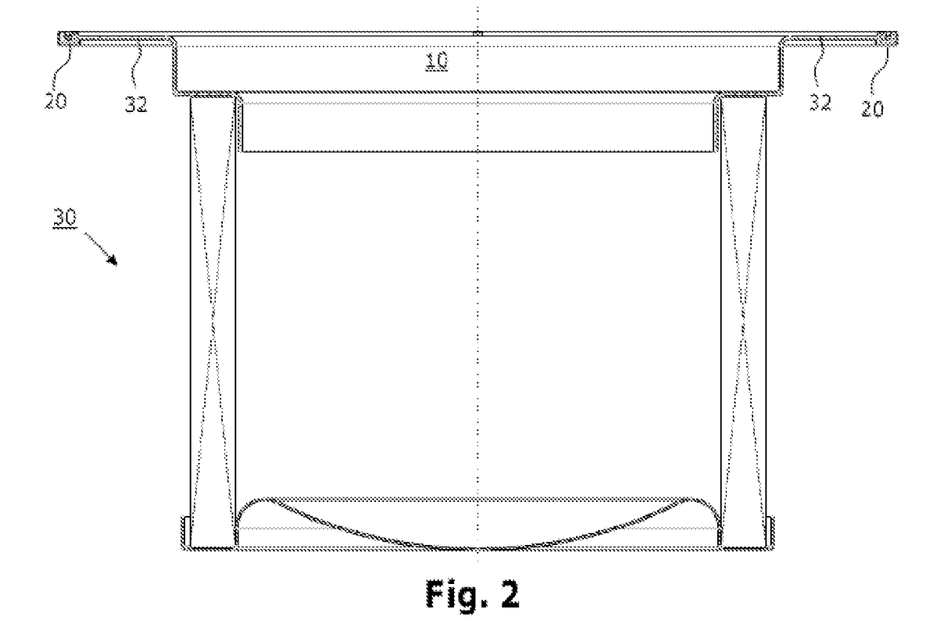
FIG. 2 shows in section illustration the separating element of FIG. 1.
Figure 3:
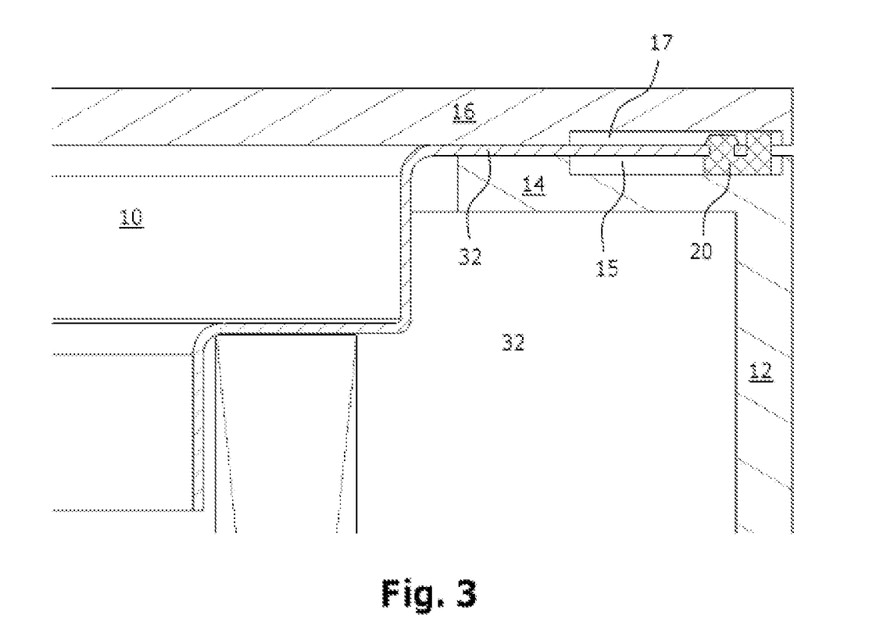
FIG. 3 shows in section illustration a detail view of the separating element arranged in the liquid separator of FIG. 1.
Figure 4:
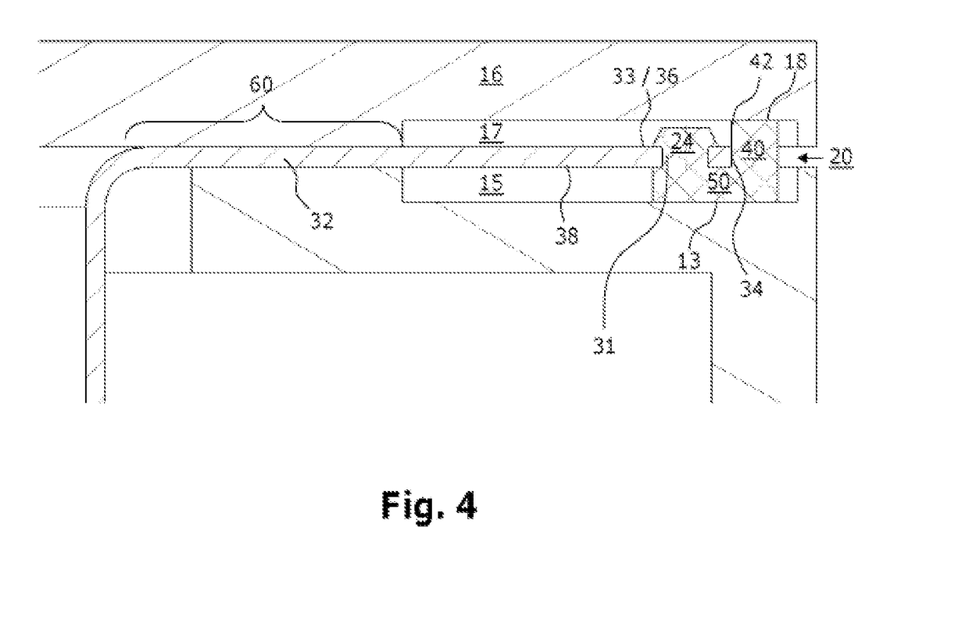
FIG. 4 shows in section illustration a further detail view of the separating element arranged in the liquid separator of FIG. 1.

FIG. 1 shows a liquid separator 100 with a separating element, i.e., an air/oil separating element, more precisely an oil separator for separating oil from a gas flow, that is mounted in a separating container, i.e., a pressure container.

The pressure container has a container opening 10, a housing 12 that has an upper area 14 surrounding the container opening, and a cover 16 embodied for closing off the container opening 10. The upper area 14 of the housing 12 is facing the cover 16. Usually, housing 12 and cover 16 are each provided with inlet openings and outlet openings 60, 61. Usually, inflow occurs into the housing 12 and outflow through outlet openings 61 in the cover 16.

The upper area 14 of the housing 12 forms a support body for a collar 32 of the oil separator that is embodied monolithic or in a one-piece configuration, for example, disk-like. The collar 32 forms a flange-like surface that is arranged perpendicular to the wall of the housing 12. The support body, as shown in FIG. 1, can be formed by an area of the housing 12 which is arranged parallel to the cover. Alternatively, as shown in the FIGS. 5 and 6, the support body 14 can also be directly formed by the wall of the housing 12.

The oil separator has a sealing element 20 which is designed for sealing the separating container relative to the ambient pressure. The sealing element 20 has a member 40 with sealing surfaces which is designed for sealing the separating container wherein the member 40 with the sealing surfaces can be arranged for sealing the separating container between the upper area 14 of the housing 12 and the cover 16 in such a way that the separating container is sealed relative to the ambient pressure.

The sealing element is captively secured on the collar 32 wherein holding of the sealing element 20 on the collar 32 is realized by means of at least one holding element 24 which is monolithically formed with the sealing element 20.

The member 40 with the sealing surfaces is designed to be cylindrical or circular. On the sealing element 20, several holding knobs 24 are arranged regularly or irregularly spaced circumferentially.

The base member of the sealing element is embodied L-shaped in cross-section. The member 40 with the sealing surfaces and the holding element 24 are monolithically formed. The holding element 24 extends substantially perpendicularly to a second leg 50 of the L-shaped base member of the sealing element 20 and is substantially arranged parallel to the member 40 forming the first leg 40 of the L-shaped base member of the sealing element 20.

The second leg 50 of the L-shaped base member of the sealing element 20 is arranged parallel to the collar 32 of the separating element 30 and is contacting a first surface 36 of the collar 32 which is facing the cover 16 or a second surface 38 of the collar 32 of the separating element 30 which is facing the upper area 14 of the housing 12.

The holding element 24 extends away from the second leg 50 of the L-shaped base member of the sealing element 20 through a cutout 31 of the collar 32 of the separating element 30 to the side 33 of the collar 32 which is facing away from the second leg 50. On the side 33 of the collar 32 facing away from the second leg 50, the holding element 24 is designed such that the holding element 24 projects past the cutout 31 and in this way clamps the sealing element 20 on the collar 32.

The holding element 24 has an elastically embodied holding member which can be reduced in size by means of compression in such a way that it can be passed through the cutout 31 of the collar 32 and can expand such after having passed the cutout 31 that the holding member projects past the cutout.

In order to facilitate passing the holding element 24 through the cutout 31, the holding member can taper, for example, can be designed like the tip of a cone.

Figure 5:
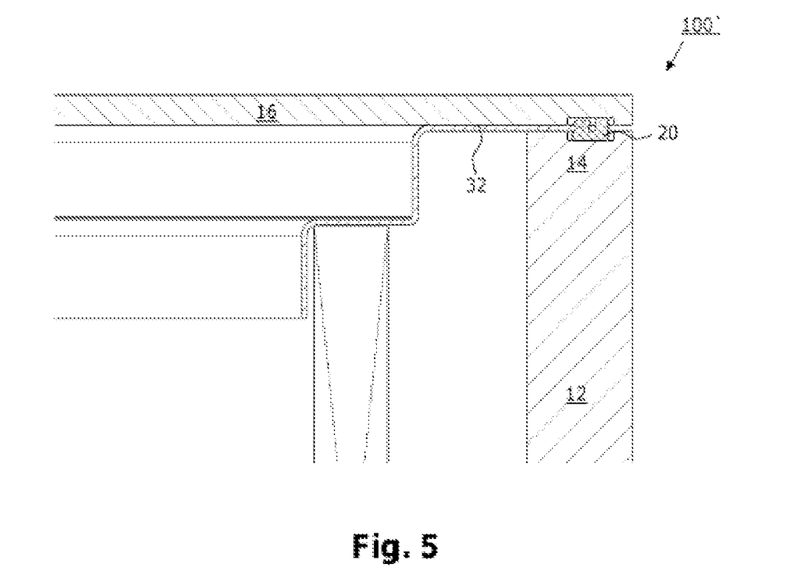
FIG. 5 shows in section illustration a detail view of a further embodiment of a liquid separator with the separating element of FIG. 1.
Figure 6:
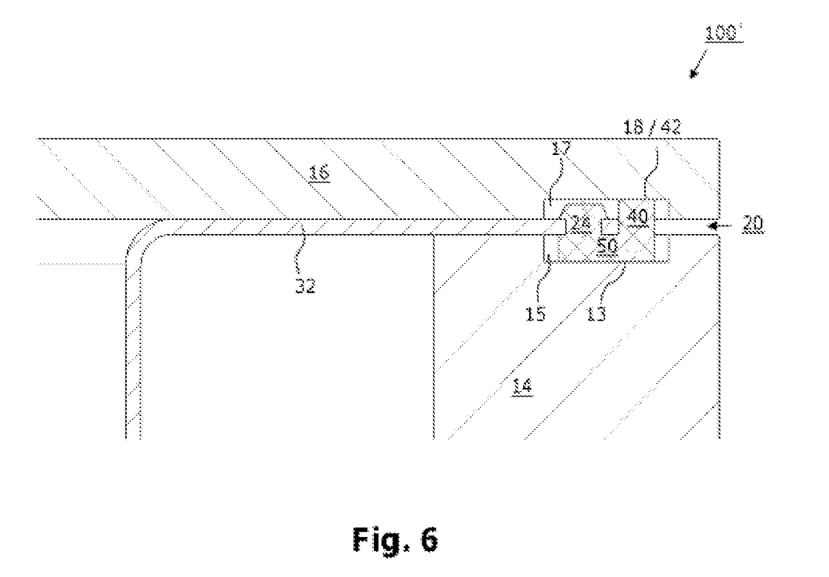
FIG. 6 shows in section illustration a further detail view of the liquid separator of FIG. 5.
Figure 7:
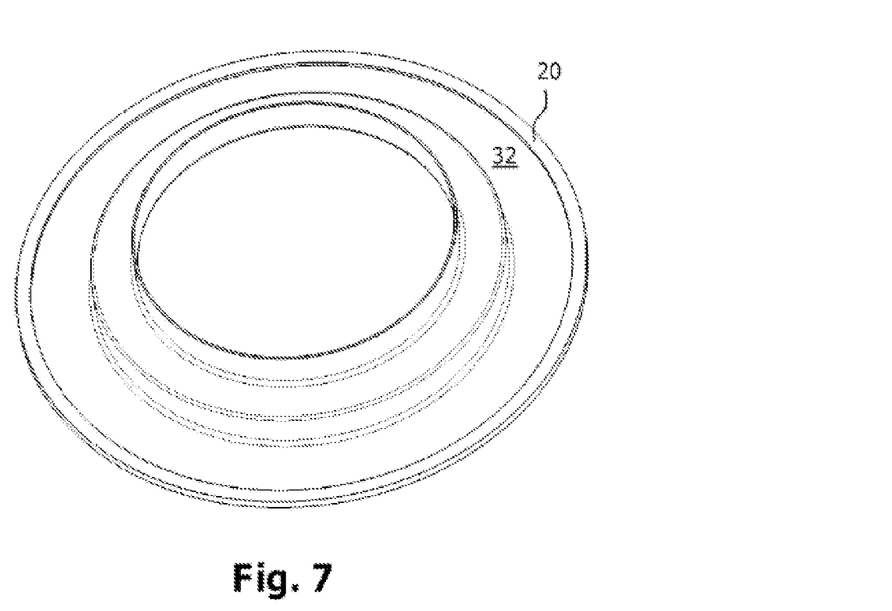
FIG. 7 is a perspective bottom view of the collar of the separating element of FIG. 1 with a sealing element.
Figure 8:
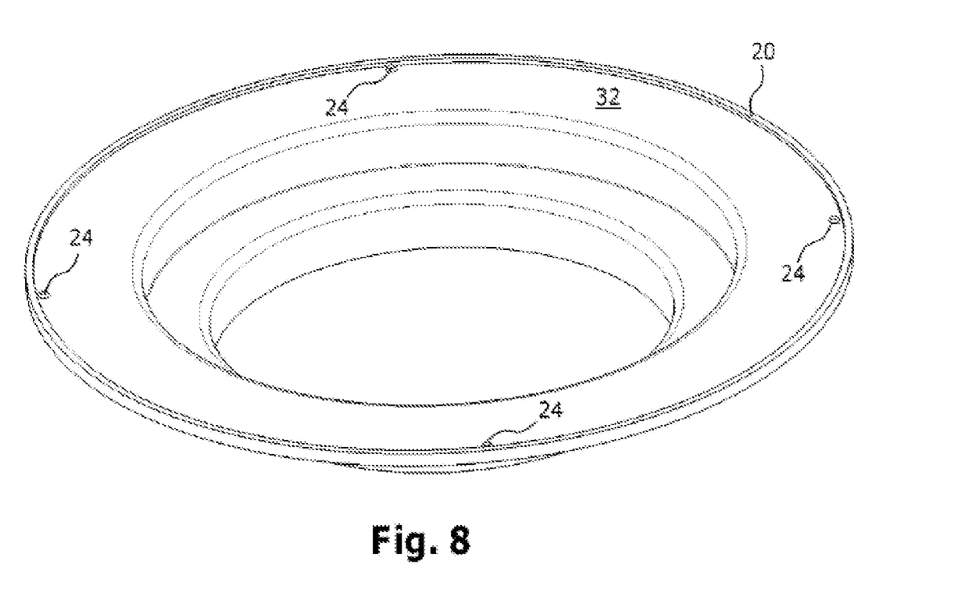
FIG. 8 is a perspective top view of the collar of the separating element of FIG. 1 with the sealing element.
Figure 9:
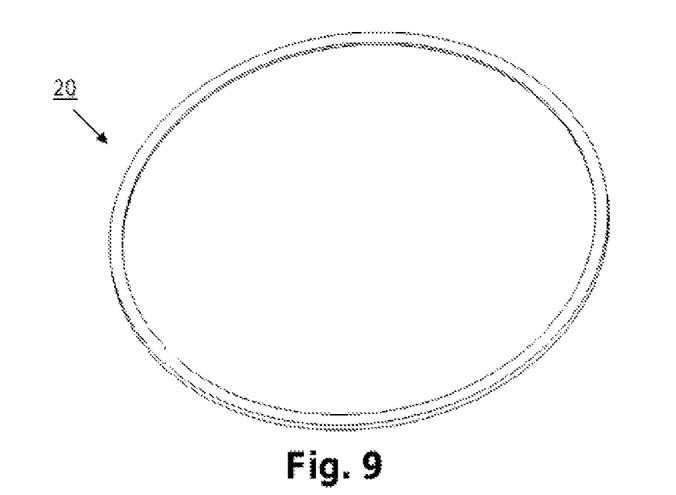
FIG. 9 is a first isometric view of the sealing element of the separating element of FIG. 1.
Figure 10:
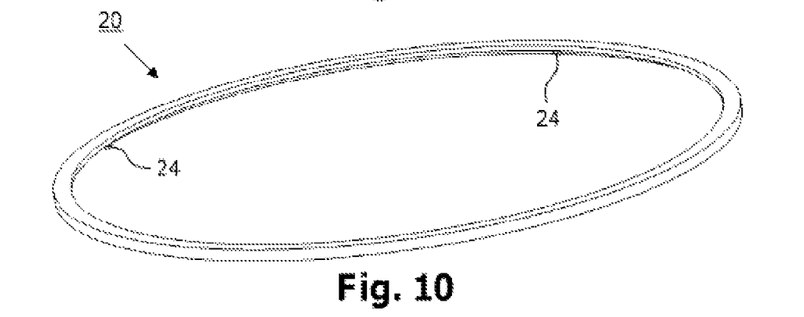
FIG. 10 is a second isometric view of the sealing element of the separating element of FIG. 1.
Figure 11:
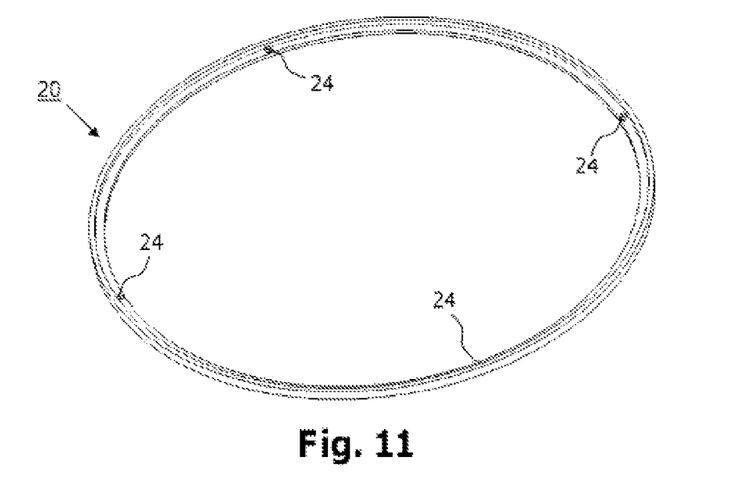
FIG. 11 is a third isometric view of the sealing element of the separating element of FIG. 1.
Figure 12:
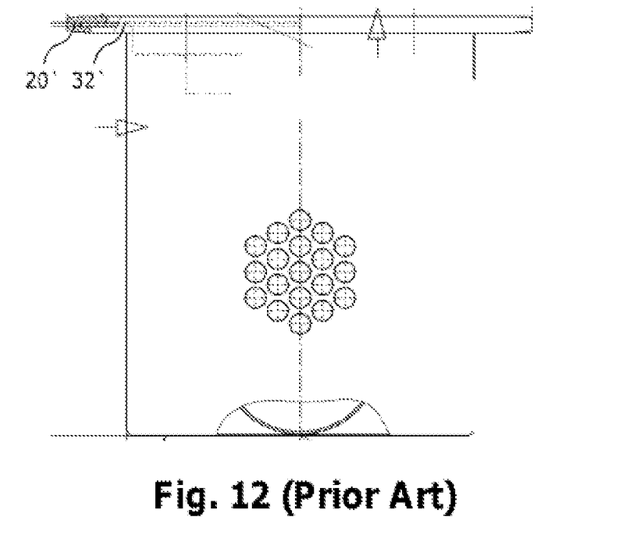
FIG. 12 is a section illustration of a liquid separator with a separating element according to the prior art.
Figure 13:
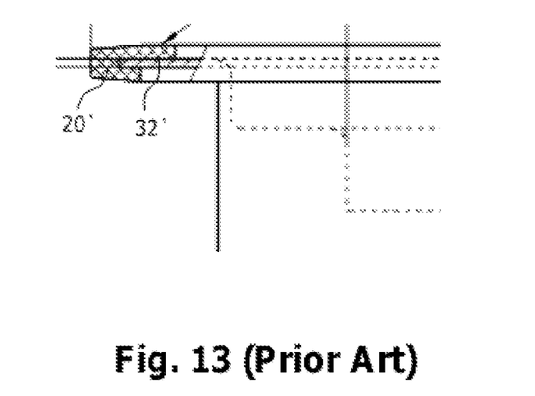
FIG. 13 shows in section illustration a detail view of the liquid separator of FIG. 12.

The embodiments illustrated in FIGS. 1, 5, and 6 concern liquid separators 100, 100' for separating liquids from a gas flow that comprise a coiled medium with glass fibers, a metal flange 32 as well as a cylindrical support member 14 of metal.

The member 40 with the sealing surfaces and the holding element 24 are designed such that the functions of sealing of the separating container and holding of the sealing element 20 are separate from each other. The holding element 24 is thus designed to fasten the sealing element 20 detachably or non-detachably on the collar 32. The holding element 24 is however not designed to seal the separating container in any way.

The separating element illustrated in FIGS. 1 to 11 can be produced in a simple and inexpensive way and has a sealing element that is captively and detachably fastened on the collar of the separating element.

While specific embodiments of the invention have been shown and described in detail to illustrate the inventive principles, it will be understood that the invention may be embodied otherwise without departing from such principles.

What is claimed is:

1. A separating element for separating at least one liquid from a gas flow, wherein the separating container comprises a housing with a container opening and a cover adapted to close off the container opening, wherein the separating element comprises:
    a monolithically embodied collar adapted to be arranged between the housing and the cover of the separating container and to be supported on an upper area of the housing facing the cover;
    a sealing element comprising sealing surfaces adapted to be arranged between the upper area of the housing and the cover such that the separating container is sealed by the sealing element relative to ambient pressure;
    the sealing element comprising at least one holding element that is monolithically formed with the sealing element, wherein the at least one holding element captively secures the sealing element on the collar;
    the sealing surfaces and the at least one holding element designed such that a function of sealing the separating container and a function of holding the sealing element on the collar are separate from each other;
    wherein the sealing element has a substantially L-shaped base member with a first leg and a second leg forming the L-shape of the base member,
    wherein the sealing surfaces are formed by the first leg of the L-shaped base member,
    wherein the first leg is arranged perpendicular to the collar.

2. The separating element according to claim 1, wherein the sealing surfaces and the at least one holding element are spaced apart from each other over sections thereof to embody the function of sealing of the separating container and the function of holding of the sealing element separate from each other.

3. The separating element according to claim 1, wherein the first leg for sealing the separating container is in direct contact with:
    an outer rim of the collar of the separating element, the outer rim facing away from an interior of the separating element;
    a contact surface of the cover; and
    a contact surface of the housing.

4. The separating element according to claim 1, wherein the second leg of the L-shaped base member is arranged parallel to the collar,
    wherein the second leg is contacting a first surface of the collar, the first surface facing the cover, or is contacting a second surface of the collar, the second surface facing the upper area of the housing.

5. The separating element according to claim 1, wherein the at least one holding element is fastened detachably on the collar.

6. The separating element according to claim 5, wherein the at least one holding element is fastened by a detachable clamping connection on the collar.

7. The separating element according to claim 6, wherein the at least one holding element extends from the second leg of the L-shaped base member through a cutout of the collar to a side of the collar that is facing away from second leg and the at least one holding element is configured on said side of the collar such that the at least one holding element projects past the cutout and clamps the sealing element on the collar.

8. The separating element according to claim 7, wherein on said side of the collar the at least one holding element is arranged at a spacing to the L-shaped base member.

9. The separating element according to claim 8, wherein the at least one holding element is spaced relative to the sealing surfaces at said spacing,
    wherein between the at least one holding element and the sealing surfaces of the L-shaped base member a free space is arranged.

10. The separating element according to claim 1, wherein the sealing element comprises an independent monolithically formed profile that is connected by the at least one holding element to the collar.

11. The separating element according to claim 10, wherein the at least one holding element is pushed detachably onto the collar or clamped detachably on the collar so as to secure the independent monolithically formed profile on the collar.

12. The separating element according to claim 10, wherein the at least one holding element is glued to the collar or injection-molded onto the collar so as to secure the independent monolithically formed profile on the collar.

13. The separating element according to claim 1, wherein the collar, at least at sections thereof, is directly clamped between the cover and the upper area of the housing.

14. The separating element according to claim 13, wherein the cover, the collar, and the upper area of the housing, at least in an area in which the collar is clamped directly between the cover and the upper area of the housing, are comprised of electrically conducting material and wherein the collar is clamped such between the cover and the upper area of the housing that an electrically conducting connection between the cover and the housing is provided.

15. The separating element according to claim 14, wherein the electrically conducting material is a metal.

16. The separating element according claim 1, wherein the cover and the upper area of the housing each have a recess in which the collar is arranged at a spacing to the cover and to the upper area of the housing.

17. The separating element according to claim 1, wherein the first leg forms a cylinder-tubular section having an inner wall that contacts a radial outer rim or outer surface of the collar in a seal-tight way for sealing between a raw side and a clean side of the separating container.

18. A separating element for separating at least one liquid from a gas flow, wherein the separating container comprises a housing with a container opening and a cover adapted to close off the container opening, wherein the separating element comprises:
- a monolithically embodied collar adapted to be arranged between the housing and the cover of the separating container and to be supported on an upper area of the housing facing the cover;
- a sealing element comprising sealing surfaces adapted to be arranged between the upper area of the housing and the cover such that the separating container is sealed by the sealing element relative to ambient pressure;
- the sealing element comprising at least one holding element that is monolithically formed with the sealing element, wherein the at least one holding element captively secures the sealing element on the collar;
- the sealing surfaces and the at least one holding element designed such that a function of sealing the separating container and a function of holding the sealing element on the collar are separate from each other;
- wherein the sealing element has a substantially L-shaped base member with a first leg and a second leg,
- wherein the first leg has a first free end and a second end connected to the second leg to form the L-shape of the base member,
- wherein the sealing surfaces are formed by the first leg and wherein the first leg is arranged perpendicular to the collar,
- wherein the sealing element seals relative to the cover and the housing in that the first free end contacts the cover and the second end contacts the housing, or the first free end contacts the housing and the second end contacts the cover.

19. The separating element according to claim 18, wherein the first leg is positioned between the cover and the housing and is compressed such that the second leg is without force load.

20. The separating element according to claim 18, wherein the second leg is without force load or slightly compressed between the collar and the cover or the between the collar and the housing.

* * * * *